United States Patent [19]

Rumpff

[11] 3,799,199

[45] Mar. 26, 1974

[54] DEVICE FOR MIXING TWO COMPONENTS

[75] Inventor: Dieter Rumpff, Geretsried, Germany

[73] Assignee: Krauss-Maffei Aktiengesellschaft, Munich, Germany

[22] Filed: Apr. 5, 1972

[21] Appl. No.: 241,130

[30] Foreign Application Priority Data
Apr. 10, 1971 Germany.................. 2117533

[52] U.S. Cl.............. 137/625.4, 259/4, 308/5, 425/245, 251/282
[51] Int. Cl..................................... F16k 11/07
[58] Field of Search............ 259/4, 95, 98; 137/237, 137/246.12, 248, 249, 625.4, 625.48; 425/4, 249, 425, 817 R, 145, 244, 245; 92/86.5, 181, 182, 162; 277/135; 308/5

[56] References Cited
UNITED STATES PATENTS

| | | | |
|---|---|---|---|
| 2,833,602 | 5/1958 | Bayer | 92/162 R X |
| 3,260,501 | 7/1966 | Raymond | 251/282 |
| 3,554,558 | 1/1971 | Rajakovics | 277/135 X |
| 3,706,515 | 12/1972 | Keuerleber et al. | 425/4 |

Primary Examiner—Henry T. Klinksiek
Attorney, Agent, or Firm—Karl F. Ross; Herbert Dubno

[57] ABSTRACT

A device for mixing two components, e.g., two or more substances adapted to form a moldable synthetic resin, in which longitudinal grooves are provided in the external periphery of a valve body.

7 Claims, 10 Drawing Figures

PATENTED MAR 26 1974

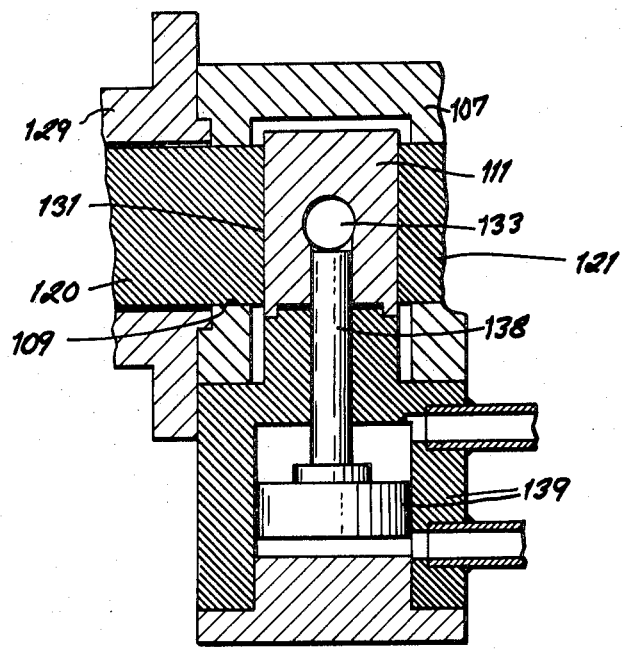
FIG. 10
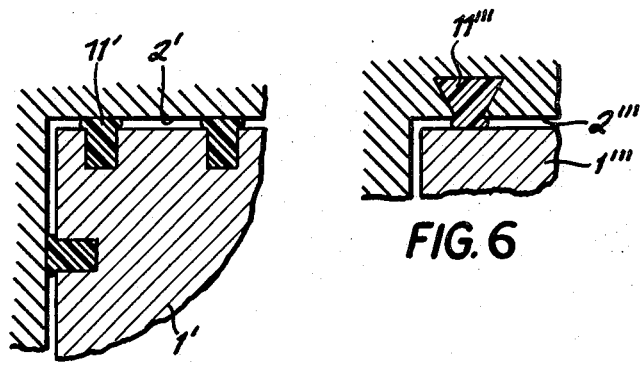
FIG. 5
FIG. 6

3,799,199

DEVICE FOR MIXING TWO COMPONENTS

CROSS REFERENCE TO RELATED APPLICATION

The present application is related to the commonly owned application Ser. No. 115,205 filed 16 Feb., 1971 and entitled: DEVICE FOR FEEDING FLOWABLE MATERIAL TO MOLD CAVITY, now U.S. Pat. 3,706,515.

FIELD OF THE INVENTION

The present invention relates to devices for controlling the flow of flowable materials and for feeding two components, both of which are flowable, to a mold cavity. More particularly the invention relates to a device for mixing two reactive components to form a hardenable mixture, and feeding the mixture to a mold cavity.

BACKGROUND OF THE INVENTION

With the increasing use of synthetic resin materials the provision of devices for feeding such materials to mold cavities has been given increased attention. For example it is known to introduce into a mold cavity a single polymerizable or hardenable component, this being carried out by connecting a source of the material under pressure with the mold cavity and by pressurizing the source or placing a valve in the supply line to control the introduction of the material into the cavity.

Difficulties are, however, encountered when two part synthetic resins are to be combined, mixed or otherwise formed into a hardenable mass, prior to or at introduction of the hardenable mixture into the mold cavity. The two-part synthetic resin may consist of a catalyst component and a monomer component, two or more polymerizable monomers adapted to form a copolymer, or an inactive resin and an activator therefor.

In each case the two components must be mixed so that a uniform reaction occurs in the mold cavity, but must be kept separate from one another until the mixing is desired. See the above-mentioned patent.

OBJECTS OF THE INVENTION

It is the principal object of the present invention to provide a device for controlling the flow of two or more reactive components, for mixing such components and, advantageously, for charging a mold cavity with the mixture, which will avoid the aforementioned disadvantages and extend the principle set forth in the commonly owned copending application identified earlier.

It is another object of our invention to provide a valve and control system for introducing two or more interactive components to a mold cavity.

Yet another object of the invention is to provide an improved device for introducing two-component reactive synthetic-resin mixtures into a mold cavity in such manner as to increase the quality of the product produced therein, reduce the product cost, and carry out the improved procedure with low equipment cost.

Yet a further object of the instant invention is to provide an improved system for controlling the mixing of two or more reactive components in the presence of a blowing agent, expanding agent or foaming agent.

SUMMARY OF THE INVENTION

It has now been found, most surprisingly, that a system of the type described in the copending application can be markedly improved, especially with respect to the sealing of the valve member, by providing a chamber in which a valve or control body is displaceable and which has a pair of ports, each connected with a source of a respective one of the components to be mixed, a mixture-discharge port communicating with a mixing compartment of this chamber, and a pair of outlet ports, each connected with one of the aforementioned sources in a return path. The valve or control body is shiftable within this chamber between a position in which the latter two ports are blocked but communication is permitted through the mixing compartment between the two inlet ports and the mixture-discharge port, the two components being mixed and supplied to the mold cavity in this position of the control body. In another operating position of the latter, communication between the inlet ports and the mixture-discharge port (and/or the mixing compartment) is blocked and communication is established through passages formed in the valve or control body and separated from one another, to the outlet or return ports whereby independent recirculating streams of the components are established. It has now been found that the sealing between the return paths can be carried out with a substantial reduction in the size of the device by providing the valve or control body (and/or the inner wall of the chamber which sealingly co-operates therewith) with longitudinally extending grooves separated by longitudinally extending lands, the function of these grooves being described in greater detail below.

It will be apparent that, in the second operating position of the valve or control body, a seal is maintained between the individual component-recirculating paths by the sealing surfaces of the elongated control body between the passages mentioned above, the passages being generally constituted as channels of relatively large cross-section (by comparison with the cross-section of the longitudinal groove). If the overall cross-section of the chamber and the control body is made smaller, the width of the sealing surface is reduced and a possible transfer of material between the passages may occur. On the other hand, large-width sealing surfaces require larger cross-sections and hence larger control devices. A larger control device has the added disadvantage that the mixing compartment increases in volume and the lag of the system becomes considerable. Furthermore, an excessive volume of residue may remain in the mixing chamber to the detriment of the molding process.

The longitudinal grooves mentioned earlier afford increased sealing possibilities since the grooves at once fill with the synthetic-resin components which harden to a greater or lesser extent, either by reaction of one with the other or with aging, to provide sealing ribs which completely fill the grooves and produce an in situ sealing layer engaging the walls of the chamber. The sealing effect is thus far superior to that which is obtained with the most meticulous fitting of an ungrooved machined surface.

The longitudinal grooves which may, in practice, be a semicircular, semielliptical or semioval, rectangular, triangular or other cross-section, can be formed on the wall of the chamber as indicated earlier, but preferably are formed in the surface of the control body or slide, e.g., by milling and may extend from a location just short of one end of the slide to a location just short of the other end thereof. It will be apparent that the system of the present invention not only provides in situ sealing ribs, as mentioned, but also eliminates the need for repeated cleaning of the walls of the housing of the chamber since the slide, via the ribs, constantly bears upon the chamber wall even in the mixing compartment.

Advantageously, each end of the slide, or at least the end turned away from the mixture-discharge port, is provided with transverse sealing grooves, i.e. sealing grooves extending in the peripheral direction, which interconnect the longitudinal grooves so that a fluid mass may flow uniformly into and along both the longitudinal and transverse grooves.

It has also been found to be desirable, particularly when the controlled chamber cross-section is generally cylindrical to form the grooves as longitudinally extending flats of the control or valve body, thereby imparting a polygonal cross-section to the latter. In this case, machining and assembly is facilitated and the space defined between each flat and the juxtaposed wall portion of the mixing chamber is constituted as a groove in which a sealing rib is adapted to harden.

It has been found to be particularly desirable to provide the control slide of square or rectangular cross-section, two opposite faces being formed with the respective passages for the synthetic-resin components, while the other two faces are provided with longitudinally extending grooves defining longitudinally extending ribs or lands between them. In addition, the faces flanking the passages may also be provided with grooves and the longitudinally extending groove at each or either end of the control slide may be interconnected by transverse grooves in the manner already described. This cross-sectional configuration provides considerable peripheral spacing of the passages which, along the sealing interface, are separated by much larger distances than can be obtained with cylindrical configuration. For a given volume or bulk, therefore, the separation of the passages can be increased by the use of the rectangular cross-section while the unit may be reduced in size for a given separation. Moreover, the cross-sectional shape is particularly easily manufactured, is adapted to the provision of four recirculation passages and the control of four individual components.

DESCRIPTION OF THE DRAWING

The above and other objects, features and advantages of the present invention will become more readily apparent from the following description, reference being made to the accompanying drawing in which:

FIGS. 5 and 6 are detail views illustrating other features of the present invention;

FIG. 10 is a detail view of a portion of the device of FIG. 9.

SPECIFIC DESCRIPTION

Figure 1:
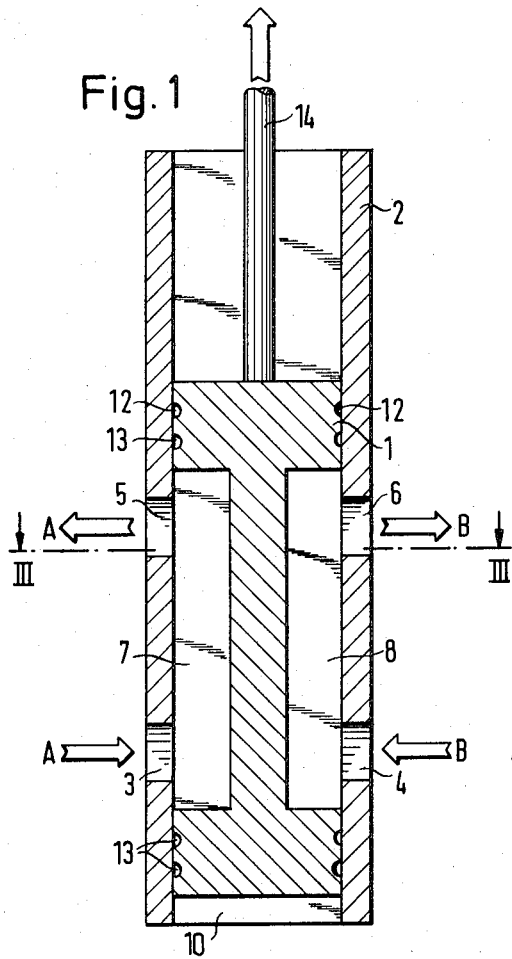
FIG. 1 is an axial cross-sectional view through a control slide arrangement according to the present invention, the section being taken generally along the line I — I of FIG. 3.
Figure 2:
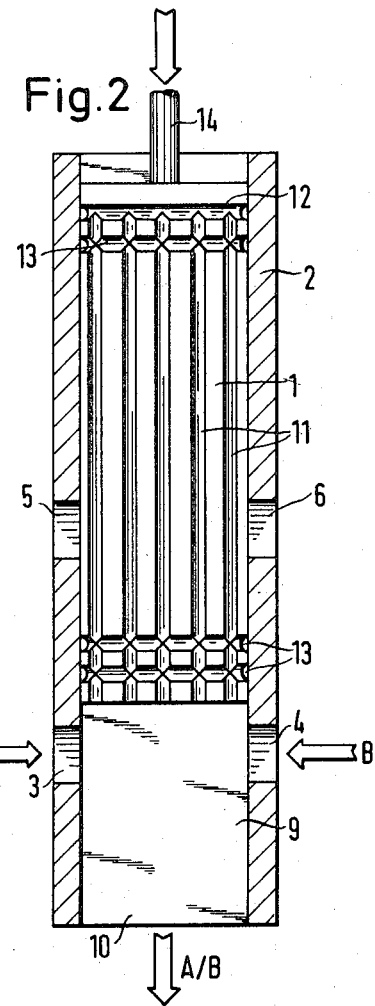
FIG. 2 is a view showing the slide housing in cross-section along the line II — II of FIG. 3, but illustrating the slide in elevation.
Figure 3:
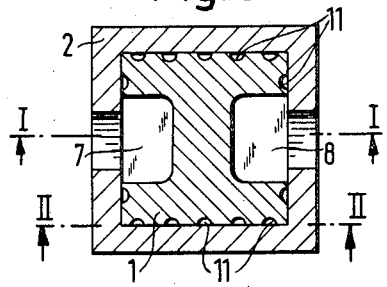
FIG. 3 is a section generally along the line III—III of FIG. 1.

In FIGS. 1 – 3, I have shown a control-valve construction for a molding apparatus as described hereinafter with respect to FIGS. 7 – 10. More particularly, the configuration of the control body and the grooved arrangement thereof illustrated in FIGS. 1 – 3 may be used in place of any of the control bodies of FIGS. 7 – 10.

In FIGS. 1 – 3, the control body 1 is shown to have a rectangular configuration and is axially shiftable in a housing 2 of similar (square) cross-section. The control body 1 is shiftable between two extreme positions. The housing 2 defines a mixing chamber 9 into which the synthetic resin materials may be fed. Inlets 3 and 4 of the housing are aligned along opposite walls thereof corresponding to two of the oppositely facing longitudinal sides of the slide 1. Each of these ports 3, 4 is associated with a recirculation port 5 or 6 for the components A and B which are to be mixed together, a recirculating path being formed by appropriate ducts and a metering pump for each of the components as described hereinafter with respect to FIGS. 7 – 10.

The slide 1 is formed along its other longitudinally extending sealing sides with mutually parallel longitudinally extending grooves 11 running substantially the length of the slide. In the faces turned toward the ports 3, 5 and 4, 6 respectively, the slide is provided with by-pass channels or ducts 7 and 8 having a length at least equal to the longitudinal spacing between the ports on each side of the housing.

In the first position of the slide represented in FIG. 1, the ports 3 and 4 are connected respectively with the ports 5 and 6 and the components are shunted in respectively recirculation paths without mixing. In the other extreme position (FIG. 2), the ports 5 and 6 are blocked and components A and B are permitted to flow into chamber 9 for mixing. The mixture is discharged through outlet port 10.

The movement of the slide 1 is effected by a rod 14 or some other means in accordance with the principles set forth with respect to FIGS. 7 – 10.

The longitudinal grooves 11, some of which are provided along the channel sides formed with the passages 7 and 8, open into the mixing chamber 9 (see FIG. 2) to enable the reactive mixture to flow through these grooves, collect therein and harden or otherwise permanently interact to provide axially extending sealing ribs as shown, for example, at 11' in FIG. 5. In this Figure, the clearance between the body 1' and the housing 2' has been exaggerated. At the upper end, the slide is provided with transverse grooves 12 which collect the synthetic resin and provide a transverse seal, inasmuch as this groove extends around the entire periphery. The grooves 11, however, terminate at the transverse groove 12 and do not project therebeyond. At the lower end, additional sealing grooves 13 are provided which also fill with the synthetic resin.

Figure 4:
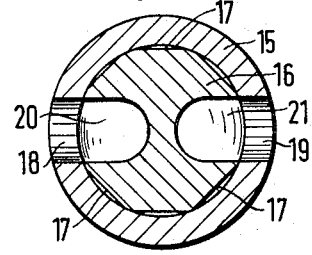
FIG. 4 is a cross-sectional view through another embodiment of a control-slide arrangement according to this invention corresponding generally to FIG. 3.

In FIG. 4, we have shown a mixing chamber which is of circular cross-section to receive a prismatic slide 16. The housing 15 is provided with ports 18 and 19 similar to the ports 3 and 4 already described and diagrammatically opposite longitudinal grooves 20 and 21 are machined in the slide. The eight sides of the polygon include planar sides 17 which form clearances with the wall of the housing 15 and are filled with the hardened resin after the initial use to provide effective sealing. In this case, six of the sides are planar and lie along chords of the interior chamber while the two other diagrammatically opposite sides are arcuate to conform to the chamber configuration.

In FIG. 6, we show an arrangement in which grooves of triangular cross-section are formed in the wall of the housing 2″ and fill with synthetic resin which, upon hardening, forms the ribs mentioned earlier. In this case, the control slide need not be provided with longitudinally extending grooves.

Figure 7:
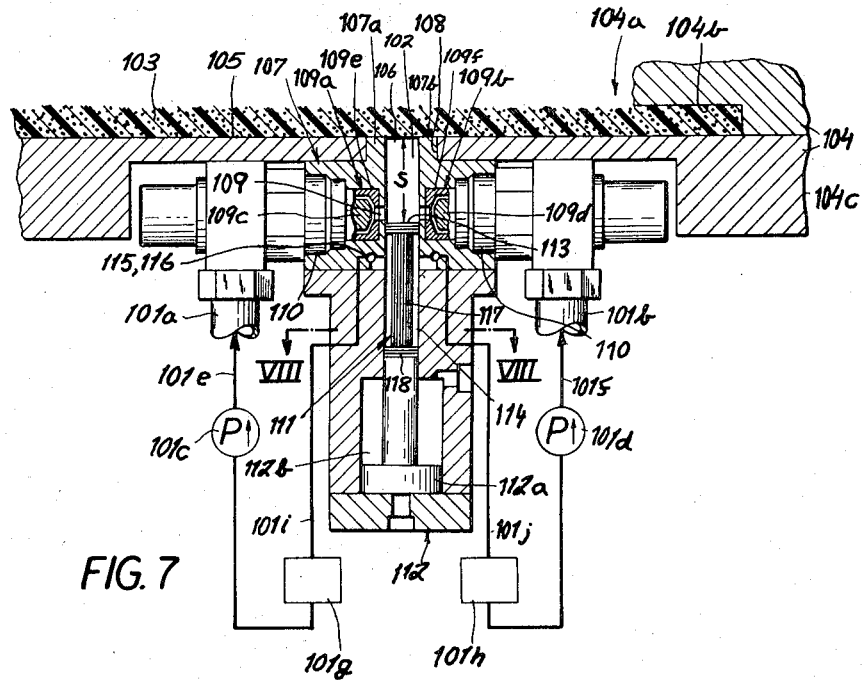
FIG. 7 is an axial cross-sectional view of a portion of a mold provided with a device according to the invention wherein, however, the control slide may have the configuration illustrated in FIGS. 1 – 5.
Figure 8:
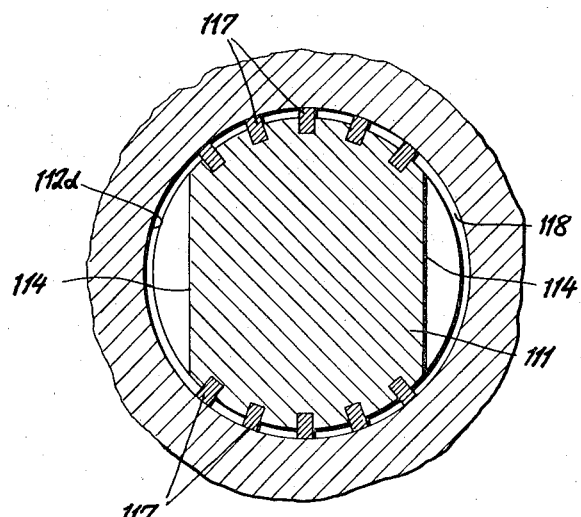
FIG. 8 is a cross-sectional view taken along the line VIII — VIII of FIG. 7.

In FIGS. 7 and 8, there is shown a device for molding foamed synthetic resin bodies 103 in a two-part mold generally shown at 104 defining a mold cavity 104a having an edge zone 104b into which the synthetic-resin mixture is adapted to penetrate. The mold plate 104c is provided with an opening 108 into which the tubular nose 107a of a mixing chamber 107 is adapted to project so that the end surface 107b of this mixing chamber lies precisely flush with the mold surface or wall 105 at the outlet 106 of the mixing chamber.

Two reactive components are supplied to the mixing chamber via feed conduits 101a and 101b, respectively, connected to metering pumps 101c and 101d of the respective feed circuits 101e and 101f. Reservoirs 101g and 101h may be provided in the recirculating paths which can have return lines 101i and 101j respectively.

Inlet ports 109 open radially inwardly at the diametrically opposite sides into the mixing chamber 102, here formed as a cylindrical bore of uniform (constant) cross section over the stretch S between the inlet ports and the surface 105. The inlet ports 109 may be formed by nozzles 109a and 109b fitted into the housing 107 and provided with central bodies 109c and 109d received within sleeves 109e and 109f as described, for example, in connection with FIG. 9.

The two reactive components are designed to mix intimately and to react (polymerize) in the presence of a foaming agent which can be incorporated in one or both of the components so that the mixture hardens upon introduction into the mold into a cellular body 103 with relatively massive edge zone (as formed at 104b) and a porous interior, the body conforming accurately to the contours of the mold.

While the mixing chamber has been shown to be cylindrical in FIG. 4, it may also be prismatic (FIG. 1) provided, as indicated earlier, the outlet 106 lies flush with the surface 105 and the mixing chamber 102 opens into the mold cavity directly, i.e., without constriction. The remainder of an atomizing device 110 is illustrated diagrammatically for each of the inlet ports and may correspond to the structure represented at 123, 124 etc. of FIG. 9.

Within the mixing chamber 102, a control slide 111 as described in FIGS. 1–4 is provided which is shiftable along the mixing-chamber axis with a stroke at least equal to S, this slide being connected with a piston 112a reciprocable in a cylinder 112b of the fluid-responsive slide control unit 112 which may be operated with hydraulic or pneumatic pressure. The end face 113 of the slide 111 is adapted to lie flush with the surface 105 in the blocking position of the slide. The slide 111, moreover, interrupts the flow from inlet ports 109 into the mixing chamber 102 at the end of the filling of the mold and simultaneously forces the mixture within the chamber 102 into the mold in the manner of a plunger.

As further illustrated in FIG. 7, the mixing chamber 102 is constituted as a plunger bore while the slide 111 is generally cylindrical (FIGS. 1–4) so that, in the flush position of the surface 113, a perfectly smooth face is formed on the body 103. Along the generatrices of the slide 111 in registry with the inlet ports 109, there is provided a pair of axially extending grooves 114 constituting recirculation or overflow channels which communicate with ducts 115 and 116 disposed in spaced relation to these ports but on the side thereof opposite the outlet 106. Hence, in the blocking position of the slide, a recirculation path is established from the inlet ports, through the grooves 114 and the ducts 115, 116 to return to the respective pumps 101c and 101d. The return or recirculating ducts or channels are dimensioned to have a cross section equal to the flow cross section of the mixing chamber 102 to prevent undue expansion of the individual components when they are diverted along their recirculating paths. To prevent leakage of the components from one inlet port 109 to the other in the blocking position of the slide, the latter may be provided with a plurality of longitudinally extending parallel sealing ribs 117 flanked on each end by circumferential sealing ribs 118 (see FIG. 8).

In the position of the slide illustrated in FIG. 7, the two components are directed transversely to the axis of the chamber 102 and at one another so that a complete and thorough mixing of the two components is effected with the chamber 102 as the mixture is fed to the mold 102 in which the synthetic resin reacts, foams and hardens to produce the cellular body. During approximately the last 2–5 minutes of the closed-mold portion of the cycle, the flow from the ports 109 into the mixing chamber 102 is interrupted by the slide 111 although the components continuously recirculate without expansion to the suction side of the component pumps. During the closing movement of the plunger 111, the residual mixture in the chamber 102 is forced into the mold cavity. After the hardening of the material in the mold and, generally, the opening of the latter, the plunger 111 is withdrawn.

Within the mixing chamber 102, the components flow in countercurrent and are intimately mixed. The forward movement of the plunger, of course, results in a purging of the chamber 102 of all residues of the mixture.

The system illustrated in the drawing has been found to be particularly suitable with two-component polymer systems in which one component includes one monomer and the other component a monomer adapted to copolymerize therewith. Each or both components may include the blowing agent. As a specific example, one component may consist of a hundred parts by weight of a polyol and 0 to 20 parts by weight of a blowing agent, e.g., a fluorochlorohydrocarbon of the Freon type, 0 to 5 parts by weight of activators, emulsifiers and stabilizers of the type conventionally used in the formation of foamed polyurethane resins. The polyisocyanate (120 to 160 parts by weight), together with the remainder of the blowing agent (to a total of 20 parts by weight) constitutes a second component. When the first component contains up to 10 parts by weight of the blowing agent, therefore, the second component up to 10 parts by weight thereof as well. Either or both of the components may contain nonreactive and filler materials such as glass fiber, pigments and extenders. Of course, a third inlet port 109 may be provided and the three ports will then open in the same transverse plane in the direction of the axis of the mixing chamber and will preferably be angularly equispaced about the latter. A three-port system has been found to be effective for caprolactam polymers in which case a first component may be 100 parts of caprolactum, the second component 0.6 to 5 parts of the catalyst and the third component several parts of an activator such as an isocyanate.

Figure 9:
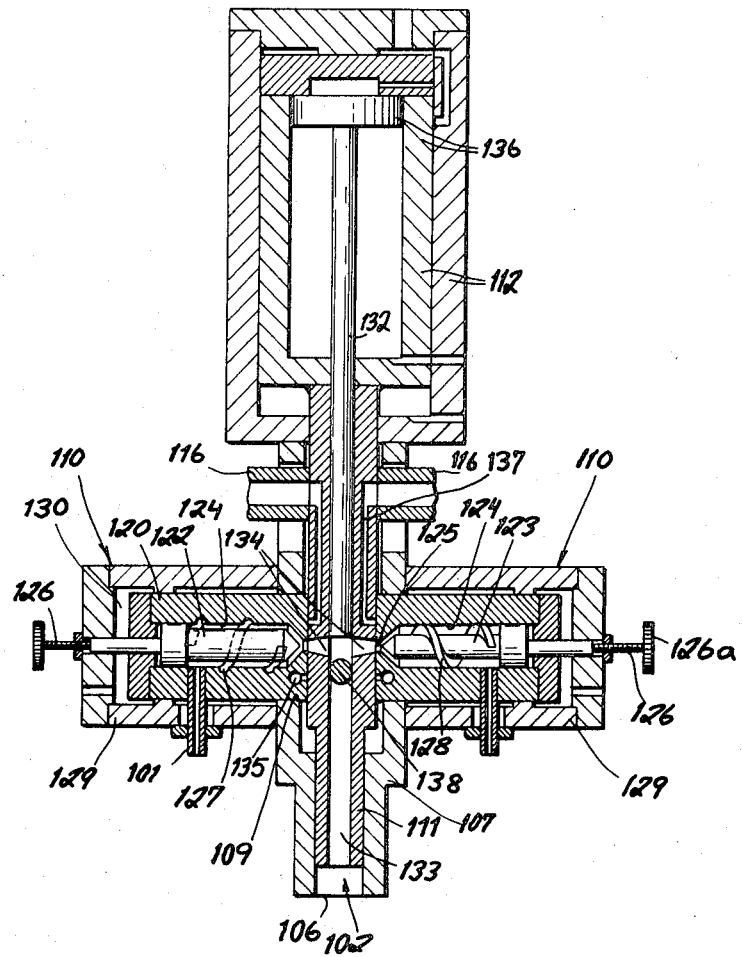
FIG. 9 is an axial cross-section through a device according to another embodiment but wherein the control slide also has the configuration of FIG. 2.

In FIG. 9, there is shown another system in which numerals corresponding to those of FIG. 7 represent similarly functioning parts. The individual inlet ports 109 of the mixing chamber 102 are here so dimensioned that the individual atomizing devices 110 extend into these ports. Each atomizing device 110 comprises a sleeve 120 or 121 receiving a cylindrical insert 112 or 123 whereby, between each sleeve 120 or 121 and the respective central body 122 or 123, an annular space or annulus 124 is provided. At the outlet end of each of the atomizing nozzles, the sleeve 120 or 121 is funnel shaped or frustoconically convergent to the diameter of the atomizing outlet. Similarly, the central bodies 122 and 123 conically converge to points and are generally complementary to the frustoconical outlets of the sleeves 120 and 121. Adjusting devices, e.g., threaded spindles 126 having milled heads 126a for manual displacement, or conventional hydraulic devices not further illustrated, can shift the central bodies 122 or 123 relative to the sleeves 120 or 121, axially to increase or reduce the flow cross section of the conical portion of the annular gap 124 in a stepless manner. Thus the atomizing pressure of each synthetic resin component, in accordance with its individual viscosity or the degree of dispersion, can be set precisely independently of the position of the slide 111. The central bodies 122 or 123 are so arranged and constructed that the opening of the conical portion of annular gap 124 is about 0.4 mm in the filling position of the control slide 111 but up to 10 mm in the blocking position of this control slide. Consequently, a hydraulic device in which the bodies 122 and 123 are coupled with the cylinder 112 controlling the slide 111 is desirable.

As is also apparent from FIG. 9, the diametrically opposite atomizing devices 110 are provided with screw-like guide members to impart a rotation to the respective components as they are forced into the mixing chamber. These screw-type formations may be screw-type grooves as illustrated at 127, formed in the inner wall of the sleeve 120, or screw-type ribs 128 as shown upon the central body 124 at the right-hand side of FIG. 9. The atomizing devices 110 are received in respective fluid cylinders 129 which produce hydraulic pressure cushions 130 which bias the members 120 and 121 directly against the slide 111. In this embodiment, the engaging surfaces of the slide 111 and the sleeves 120 and 121 are planar to insure an effective seal. This arrangement has the advantage that the pressure of the sleeves 120 and 121 against the slide 111 can be relieved upon closing the slide 111, thereby permitting the closing movement to be rapid. On the other hand, the high pressure required for effective sealing in the mold-filling condition can also be obtained. Moreover, during the closing movement of the slide 111, the relaxation of the sealing pressure reduces the tendency of the surface of the slide to wear.

A planar sealing surface has been found to have some important advantages, especially when, for example, four components are to be supplied individually to the mixing chamber. In this case, the slide 111 may be prismatic or, for example, square cross section. With six components, each with the respective atomizing nozzle, a six-sided (hexagonal) slide is used.

The slide 111 is provided with an axially extending bore 133 in which a plunger 132 is axially shiftable. A pair of inwardly frustoconically divergent transfer ports 134 open into the bore 133 and, in the filling position of the slide 111, register with the atomizing devices 110. In the blocking position of the slide 111, however, these ports register with blowout ducts 135. To actuate the plunger 132, there is provided a further piston-and-cylinder arrangement 136 which is coaxially received within the piston-and-cylinder arrangement 112 for actuating the control slide.

At the end of the mixing and mold-filling stage, therefore, the slide 111 can be shifted as described in connection with FIG. 7 to bring the atomizing nozzles 125 into communication with bypass channels 137 and return line 116 of the component-circulation systems. Simultaneously, the transverse ports 134 communicate with the blowout ducts 135. The individual components, of course, circulate freely and independently. One of the blowout ducts 135 communicate with the compressed-air source while the other opens freely in the atmosphere. Any residue of the components or their mixture is blasted out of the ports and out of the housing. Subsequently, the plunger 132 advances to the outlet 106 as does the slide 111 so that the housing 107, the slide 111 and the plunger 132 all lie flush with the mold face as described earlier. The plunger 132 can then be retracted and, once the slide 111 is drawn away from the mold to permit ports 134 to register with the inlets 125 from the atomizing nozzle, the mixing and filling portion of the cycle is repeated. As illustrated in FIGS. 9 and 10, a transverse pin 138 may be provided for partial obstruction of the bore 133 in the immediate vicinity of the transverse ports 134. A hydraulic servomotor 139 is employed to displace the pin. The pin has the function of controlling the flow cross section and hence the mixing pressure. Once mixing has commenced, the pin may be withdrawn to a greater or lesser extent.

I claim:

1. An apparatus for mixing two fluid components and discharging the mixture thereof, comprising:
   housing means including a housing member defining a mixing chamber having an end mixture-discharge port;
   a pair of lateral inlet ports formed in said housing member and opening toward said chamber, while being connectable to respective sources of fluid components to be mixed;

a pair of lateral recirculation ports formed in said housing member and spaced from said inlet ports; and a control slide member longitudinally extending within said housing means and shiftable within said chamber between a first position affording communication between said inlet bores and said chamber, and a second position blocking such communication, said control slide member being formed with respective bypass channels in mutually spaced relationship respectively connecting each of said inlet ports with an associated recirculation port in said second position, said slide member being provided with longitudinal grooves opening toward the other member between said bypass channels for receiving said mixture and forming seals therefrom between confronting surfaces of the slide member and the housing member, said grooves being formed in the said surface of said slide member and extending from an end of said slide member turned toward said mixture-discharge opening over the length of the slide member to a location just short of the other end of said slide member.

2. The apparatus defined in claim 1, further comprising an annular transverse groove formed in the said surface of said slide member at said other end and interconnecting said longitudinal grooves.

3. The apparatus defined in claim 1, further comprising at least one annular transverse groove formed in said surface of said control slide at said one end and interconnecting said longitudinal grooves.

4. The apparatus defined in claim 1, wherein said grooves are formed as flats extending longitudinally along said slide member.

5. The apparatus defined in claim 4, wherein said chamber is cylindrical and said slide member has a polygonal cross-section.

6. The apparatus defined in claim 1, wherein said chamber and said slide member are of rectangular cross-section whereby said slide member has four sides, said channels being provided in at least one pair of opposite sides and said grooves being provided at least in the other pair of opposite sides.

7. The apparatus defined in claim 1, further comprising respective pumps communicating with said inlet ports for delivering said components thereto and having intake sides connected with the respective recirculation ports.

* * * * *

UNITED STATES PATENT AND TRADEMARK OFFICE
Certificate

Patent No. 3,799,199                                        Patented March 26, 1974

Dieter Rumpff

Application having been made by Dieter Rumpff, the inventor named in the patent above identified, and Krauss-Maffei Aktiengesellschaft, Munchen, Germany, the assignee, for the issuance of a certificate under the provisions of Title 35, Section 256, of the United States Code, adding the name of Reiner Schneid as a joint inventor, and a showing and proof of facts satisfying the requirements of the said section having been submitted, it is this 1st day of February 1977, certified that the name of the said Reiner Schneid is hereby added to the said patent as a joint inventor with the said Dieter Rumpff.

FRED W. SHERLING,
*Associate Solicitor.*